United States Patent
Obermeier et al.

(10) Patent No.: US 10,274,918 B2
(45) Date of Patent: Apr. 30, 2019

(54) OPERATING A PROGRAMMABLE LOGIC CONTROLLER

(71) Applicant: ABB RESEARCH LTD, Zurich (CH)

(72) Inventors: Sebastian Obermeier, Schinznach-Dorf (CH); Michael Wahler, Baden (CH); Thomas Locher, Zurich (CH); Sascha Stoeter, Zurich (CH)

(73) Assignee: ABB Research Ltd., Zurich (CH)

( * ) Notice: Subject to any disclaimer, the term of this patent is extended or adjusted under 35 U.S.C. 154(b) by 725 days.

(21) Appl. No.: 14/665,640

(22) Filed: Mar. 23, 2015

(65) Prior Publication Data

US 2015/0192918 A1 Jul. 9, 2015

Related U.S. Application Data

(63) Continuation of application No. PCT/EP2013/069567, filed on Sep. 20, 2013.

(30) Foreign Application Priority Data

Sep. 21, 2012 (EP) .................................... 12185466

(51) Int. Cl.
*G06F 8/65* (2018.01)
*G05B 19/05* (2006.01)
*G05B 19/042* (2006.01)

(52) U.S. Cl.
CPC ....... *G05B 19/0426* (2013.01); *G05B 19/056* (2013.01); *G05B 19/058* (2013.01);
(Continued)

(58) Field of Classification Search
CPC ......... G06F 8/60–8/70; G05B 19/0426; G05B 19/056; G05B 19/058; G05B 2219/1179;
(Continued)

(56) References Cited

U.S. PATENT DOCUMENTS 6,062,079 A * 5/2000 Stewart ..................... G01P 7/00
  73/488
6,795,918 B1 * 9/2004 Trolan ................ H04L 63/0236
  713/160

(Continued)

FOREIGN PATENT DOCUMENTS

DE   10 2004 037064 A1   2/2006
EP       0 487 117 A2    5/1992
(Continued)

OTHER PUBLICATIONS

Kumar, K. V., Value reuse optimization: reuse of evaluated math library function calls through compiler generated cache, ACM SIGPLAN Notices, vol. 38 Issue 8, Aug. 2003, pp. 60-66, [retrieved on Sep. 8, 2017], Retrieved from the Internet: <URL:http://dl.acm.org/>.*

(Continued)

*Primary Examiner* — Geoffrey R St Leger
(74) *Attorney, Agent, or Firm* — J. Bruce Schelkopf; Taft Stettinius & Hollister LLP

(57) ABSTRACT

A programmable logic controller for an industrial control system is disclosed which includes an application logic execution layer and at least one of an update checking layer and an output checking layer. The application logic layer is configured for processing sensor input data to generate an output parameter for an actuator. The output checking layer is configured for outputting only an allowed output parameter to the actuator. The update checking layer is configured for verifying whether application logic update defined by application logic update data corresponds to an application logic update in a list of allowed logic updates, and the application logic is updated only if the update data is allowed application logic update data.

19 Claims, 3 Drawing Sheets

(52) U.S. Cl.
CPC ........ *G06F 8/65* (2013.01); *G05B 2219/1179* (2013.01); *G05B 2219/13109* (2013.01); *G05B 2219/13196* (2013.01); *G05B 2219/13198* (2013.01); *G05B 2219/24214* (2013.01)

(58) Field of Classification Search
CPC ........ G05B 19/13109; G05B 19/13196; G05B 19/13198; G05B 19/24; G05B 19/214
USPC .................................................. 717/168–178
See application file for complete search history.

(56) References Cited

U.S. PATENT DOCUMENTS

| | | | | |
|---|---|---|---|---|
| 7,102,388 | B2* | 9/2006 | Murabayashi | G05B 19/0428 326/62 |
| 7,107,127 | B2* | 9/2006 | Goodman | F16F 15/00 381/71.2 |
| 7,302,562 | B1* | 11/2007 | Jacobson | G06F 8/65 713/100 |
| 7,861,085 | B1 | 12/2010 | Case et al. | |
| 8,412,754 | B2* | 4/2013 | Chen | G06F 9/45537 707/831 |
| 8,843,820 | B1* | 9/2014 | Kay | G06F 21/51 715/234 |
| 8,964,973 | B2* | 2/2015 | Chong | G05B 19/0426 380/44 |
| 9,164,501 | B2* | 10/2015 | Bellville | G05B 19/0426 |
| 2002/0120366 | A1* | 8/2002 | Goodman | F16F 15/00 700/280 |
| 2003/0117751 | A1* | 6/2003 | Murabayashi | G05B 19/0428 361/1 |
| 2004/0162996 | A1* | 8/2004 | Wallace | H04L 63/104 726/1 |
| 2005/0075831 | A1* | 4/2005 | Ilic | G06F 11/0709 702/179 |
| 2006/0081085 | A1* | 4/2006 | Otsuka | F16H 59/10 74/473.21 |
| 2006/0236374 | A1* | 10/2006 | Hartman | H04L 43/00 726/3 |
| 2006/0253277 | A1 | 11/2006 | Behringer | |
| 2008/0312755 | A1 | 12/2008 | Yoshida et al. | |
| 2008/0312877 | A1 | 12/2008 | Keese et al. | |
| 2010/0106321 | A1* | 4/2010 | Hadzidedic | G05B 19/0426 700/276 |
| 2011/0078675 | A1* | 3/2011 | Van Camp | G06F 8/65 717/170 |
| 2011/0082569 | A1* | 4/2011 | Bellville | G05B 19/0426 700/79 |
| 2011/0264718 | A1* | 10/2011 | Chen | G06F 9/45537 707/831 |
| 2013/0287208 | A1* | 10/2013 | Chong | G05B 19/0426 380/44 |

FOREIGN PATENT DOCUMENTS

| | | |
|---|---|---|
| EP | 1 494 100 A1 | 1/2005 |
| EP | 1 772 787 A1 | 4/2007 |

OTHER PUBLICATIONS

Bushey, H. W., Towards Quantifying Programmable Logic Controller Resilience Against Intentional Exploits, Master of Science Thesis, Air Force Institute of Technology, Mar. 2012, 172 pages, [retrieved on Apr. 20, 2018], Retrieved from the Internet: <URL:http://www.dtic.mil/docs/citations/ADA558730>.*

Cárdenas, A., et al., Attacks Against Process Control Systems: Risk Assessment, Detection, and Response, Proceedings of the 6th ACM Symposium on Information, Computer and Communications Security, 2011, pp. 355-366, [retrieved on Dec. 7, 2018], Retrieved from the Internet: <URL:http://dl.acm.org/>.*

Lerner, L. et al., Run-time Prediction and Preemption of Configuration Attacks on Embedded Process Controllers, Proceedings of the First International Conference on Security of Internet of Things, 2012, pp. 135-144, [retrieved on Dec. 7, 2018], Retrieved from the Internet: <URL:http://dl.acm.org/>.*

International Search Report (PCT/ISA/210) dated Jul. 24, 2014, by the European Patent Office as the International Searching Authority for International Application No. PCT/EP2013/069567.

Written Opinion (PCT/ISA/237) dated Jul. 24, 2014, by the European Patent Office as the International Searching Authority for International Application No. PCT/EP2013/069567.

Search Report dated Apr. 16, 2013, by the European Patent Office for Application No. 12185466.5.

Notification Concerning Transmittal of International Preliminary Report on Patentability (Forms PCT/IB/326 and PCT/IB/373) and the Written Opinion of the International Searching Authority (Form PCT/ISA/237) dated Apr. 2, 2015, by the International Bureau of WIPO in corresponding International Application No. PCT/EP2013/069567. (9 pages).

* cited by examiner

OPERATING A PROGRAMMABLE LOGIC CONTROLLER

FIELD OF THE INVENTION

The invention relates to a method, a computer program and a computer-readable medium for updating and/or operating a programmable logic controller and to a programmable logic controller.

BACKGROUND OF THE INVENTION

Usually, industrial control systems, for example for controlling power plants, power substations, chemical plants, etc., comprise a plurality of programmable logic controllers that are coupled to sensors and actuators of the industrial control system and that, depending on the data generated by the sensors, control the actuators.

In a programmable logic controller, application logic is executed that processes the input data from the respective sensors and that generates output parameters output to one or more actuators that control the behavior of the respective actuator.

For example, for programming a programmable logic controller, IEC 61131-3 currently defines five programming languages: function block diagram (FBD), ladder diagram (LD), structured text (ST; similar to the Pascal programming language), instruction list (IL; similar to assembly language) and sequential function chart (SFC).

The control system and in particular the controllers may be connected by a communication network that may have connections outside of the control systems. These outside connections may be used for configuring the control system, for example by updating the application logic of a programmable logic controller.

Having an authenticated connection to a programmable logic controller, every engineer having access to the control system may be allowed to change the application logic of the programmable logic controller (IEC 61131-3 compliant, e.g., function block diagram, ladder diagram) according to any purpose, including malicious intents.

This may also give viruses and Trojans that have infected an engineering PC full control of a programmable logic controller, allowing them to change the internal application logic of the programmable logic controller to any value including functionality to disguise the modified code, and thus may take control of the underlying process.

For example, an analysis of Stuxnet had shown that the malicious Stuxnet code injected into the programmable logic controllers was not directly executed, but contained a timer that unnoticeably changed the output (and thus a centrifuge's speed) to extremely low levels for a fraction of time. The code also contains a recording function of the input process image to later fake the input process image for the legitimate control.

The patent application EP 1772787 discloses a programmable logic controller connected to a plurality of input devices such as switches or sensors. According to their input device kind, the input devices are classified as safe or unsafe, for instance, an emergency stop button having a contact composed of double systems is considered safe, whereas ordinary switches with singe contact are considered unsafe. An sequence program configured by combining signals from the input devices in serial or parallel is determined to be safe or unsafe based on the combination logic and the input device classification. The determination is repeated for any change in combination logic, and results in a binary safety attribute to the output of the sequence program.

DESCRIPTION OF THE INVENTION

The above described characteristic may contradict the security principle of least privileges, which requires that the amount of granted permissions should match the required organization's business objective (which is, for example, required by the ISO 27000 series).

In particular, an engineer only should be able to change the internal application logic of a controller to those values and programs targeted for the use of the controller in the desired domain for the defined purpose, but not to values that can cause harm or allow a disguise of functionality.

It is an object of the invention to provide a secure programmable logic controller for an industrial control system.

This object is achieved by the subject-matter of the independent claims. Further exemplary embodiments are evident from the dependent claims and the following description.

An aspect of the invention relates to a method for updating a programmable logic controller. The controller may be part of an industrial control system.

According to an embodiment of the invention, the method comprises the steps of: receiving application logic update data in an update checking layer of the programmable logic controller, wherein the application logic update data contains information for updating an application logic of the programmable logic controller; checking the application logic update data by the update checking layer, whether the application logic update data is allowed application logic update data, by verifying, whether every application logic update defined by the application logic update data corresponds to an application logic update from, or in, a list of allowed logic updates; and updating the application logic with the application logic update data, only if the update data is allowed application logic update data.

In other words, the application logic update checking layer therefore consults the pre-established, exhaustive list comprising the allowed logic updates either enumerated explicitly or defined through numerical limits. The update checking is independent of any kind of permission or right associated to the originator, i.e. the engineer or operator that initiated or programmed the update request.

The update checking layer, which may be implemented in software or hardware, provides whitelisting expertise for the programmable logic controller, i.e. the list of allowed logic updates may be seen as a whitelist for programmable logic updates. The list of allowed logic updates may comprise or define characteristics of allowed logic changes, used functions and/or parameters. The characteristics may relate to boundaries of physical process safety for the process controlled by the programmable logic controller.

The application logic update data is intended to include a complete application program that is provided to an empty or erased controller memory or PLC data store. In other words, the term "update" as used herein does not limit the applicability of the present invention to use cases with initial logic application programs already being present at the application logic layer of the controller.

The programmable logic controller only accepts changes in its application logic that correspond to the defined list of allowed changes. The characteristics of allowed logic changes of a PLC application may be based on the domain in which the programmable logic controller is used. In case the programmable logic controller is to be used in a different domain, a special role, for example a super-user, may have to log into the controller via a secured connection and change the list.

According to an embodiment of the invention, the application logic update data comprises an update of a function of the application logic. An update of a function is allowed, when the function is listed in a list of allowed functions that is part of the list of allowed logic updates.

By way of example, an initial setup of the list of allowed functions may be generated in the following way: The update checking layer may analyze the used functions (e.g. functions of the programming language) that have been used to generate previous application logic, either historically in the programmable logic controller itself, or in peer controllers of the control system. These functions are transferred into the list of allowed functions. All other functions are disallowed for application logic updates.

According to an embodiment of the invention, the application logic update data comprises an update of a parameter used by the application logic. An update of a parameter is allowed, when an updated parameter value is within a predefined range defined in a list of predefined ranges of application logic parameter values that is part of the list of allowed logic updates. For example, the arguments of functions (e.g. from a used programming language) may be restricted to specific parameter ranges stored in the list of allowed application logic updates.

A further aspect of the invention relates to a method for operating a programmable logic controller.

It has to be noted that the method for updating a programmable logic controller may be part of the method for operating programmable logic controller as described in the following.

According to an embodiment of the invention, the method comprises the steps of: receiving sensor input data from at least one sensor coupled to the programmable logic controller; processing the sensor input data with application logic stored in the programmable logic controller to generate an output parameter; receiving the output parameter in an output checking layer of the programmable logic controller; checking the output parameter by the output checking layer, whether the output parameter is an allowed output parameter, by checking whether the output parameter corresponds to a list of allowed output parameters; and outputting only an allowed output parameter to an actuator coupled to the programmable logic controller.

Also the list of allowed output parameters may be seen as a whitelist for output parameters and the output checking layer may be seen as corresponding whitelist functionality.

The check may be performed by the output checking layer, an additional layer that controls access to the actuators and/or sensors.

It may be possible that some characteristics of the output parameters depend in such a way on the sensor input data that they may only be checked during runtime. For example in this case, the controller may (also) perform checks whether the characteristics are violated during the execution of the application logic. This may be based on an actual state of the controller, for example by querying certain variables/parameters that are part of the whitelist.

For example, an initial setup of the list of allowed output parameters may be generated in the following way: The output checking layer may notice or record all input data and output parameters of the initial application logic and may correlate them to generate the list of allowed output parameters.

Execution time may be saved by limiting the whitelist-check to those assertions/rules that depend on variables that have changed since the last check, while checks that will knowingly produce the same result are not repeated.

According to an embodiment of the invention, the method further comprises the step of: notifying a control system by the output checking layer, in the case that a not allowed output parameter has been detected. For example, a central controller may be informed that not allowed functionality is executed in a specific controller.

According to an embodiment of the invention, the method further comprises the step of: stopping the programmable logic controller and/or the actuator, in the case that a not allowed output parameter has been detected. Depending on the configuration, the output checking layer may initiate a safety stop.

According to an embodiment of the invention, the list of allowed application logic updates and/or the list of allowed output parameters is stored in the programmable logic controller. For example, the list of allowed application logic updates may be part of the update checking layer. The list of allowed output parameters may be part of the output checking layer. It is also possible that the list of allowed output parameters is part of the list of allowed application logic updates. Thus, both checking layers may perform their verifications based on the same list.

According to an embodiment of the invention, the list of allowed logic updates and/or the list of allowed output parameters is provided in the programmable logic controller such that is not modifiable after an installation of the programmable logic controller in a control system. In other words, the whitelisting functionality "burned into" the controller, for example by the vendor. It is not possible to change it later.

According to an embodiment of the invention, the list of allowed logic updates and/or the list of allowed output parameters is only changeable via local access to the programmable logic controller. The whitelisting functionality may only be changeable having local physical device access.

According to an embodiment of the invention, the method further comprises the steps of: allowing an update of the application logic only by a user with a specific user permission; and allowing an update of the list of allowed logic updates and/or the list of allowed output parameters only if the update is received from a user with a super-user permission different from the specific user permission. The whitelisting functionality may be changeable remotely via special user permissions that are not granted to regular users, for example engineers.

The list of allowed application logic updates and/or of allowed output parameters may be changed during commissioning by special roles, for example by a person ("super-user") different from the application engineer that will have the rights to update the application logic in the application domain.

A further aspect of the invention relates to a computer program for a programmable logic controller, which, when being executed by a processor of the programmable logic controller is adapted for executing the steps of the method for updating and/or operating a programmable logic controller as described in the above and in the following.

A further aspect of the invention relates to a computer-readable medium, on which such a computer program is stored. A computer-readable medium may be a floppy disk, a hard disk, an USB (Universal Serial Bus) storage device, a RAM (Random Access Memory), a ROM (Read Only Memory) and an EPROM (Erasable Programmable Read Only Memory). A computer-readable medium may also be a data communication network, e.g. the Internet, which allows downloading a program code.

A further aspect of the invention relates to a programmable logic controller for an industrial control system. It has to be understood that features of the updating and/or operating method as described in the above and in the following may be features of the programmable logic controller as described in the above and in the following and vice versa.

According to an embodiment of the invention, the programmable logic controller comprises an application logic execution layer and at least one of an update checking layer and an output checking layer.

The application logic layer may be adapted for receiving sensor input data from at least one sensor coupled to the programmable logic controller and for processing the sensor input data to generate an output parameter.

The output checking layer may be adapted for receiving the output parameter; checking the output parameter, whether the output parameter is an allowed output parameter corresponding to a list of allowed output parameters; and for outputting only an allowed output parameter to an actuator coupled to the programmable logic controller.

The update checking layer may be adapted for receiving application logic update data, wherein the application logic update data contains information for updating the application logic. The update checking layer may be adapted for checking the application logic update data, whether the application logic update data is allowed application logic update data, wherein the update checking layer checks, whether every application logic update defined by the application logic update data corresponds to an application logic update in a list of allowed logic updates; and for updating the application logic, only if the update data is allowed application logic update data.

With the update checking layer and/or the output checking layer a whitelisting functionality may be included directly into the programmable logic controller. This may allows a safer operation of devices comprising or being connected to such a controller.

Summarized, the updating and/or the operating method as well as the programmable logic controller may provide the following features:

Characteristics of allowed application logic (for example, a use of special functions, an amount of timespans for monitoring before an action takes place, a change of input data, etc.) and/or for allowed output parameters (that may be restricted to a predefined range) may be defined.

Each change of application logic code (i.e. application program and/or parameters of the program) may be checked, whether the change corresponds to the defined characteristics (for example, whether only allowed functions are used).

During the execution of the application logic, it may be checked, whether the defined characteristics still hold.

These and other aspects of the invention will be apparent from and elucidated with reference to the embodiments described hereinafter.

BRIEF DESCRIPTION OF THE DRAWINGS

The subject matter of the invention will be explained in more detail in the following text with reference to exemplary embodiments which are illustrated in the attached drawings.

In principle, identical parts are provided with the same reference symbols in the figures.

DETAILED DESCRIPTION OF EXEMPLARY EMBODIMENTS

Figure 1:
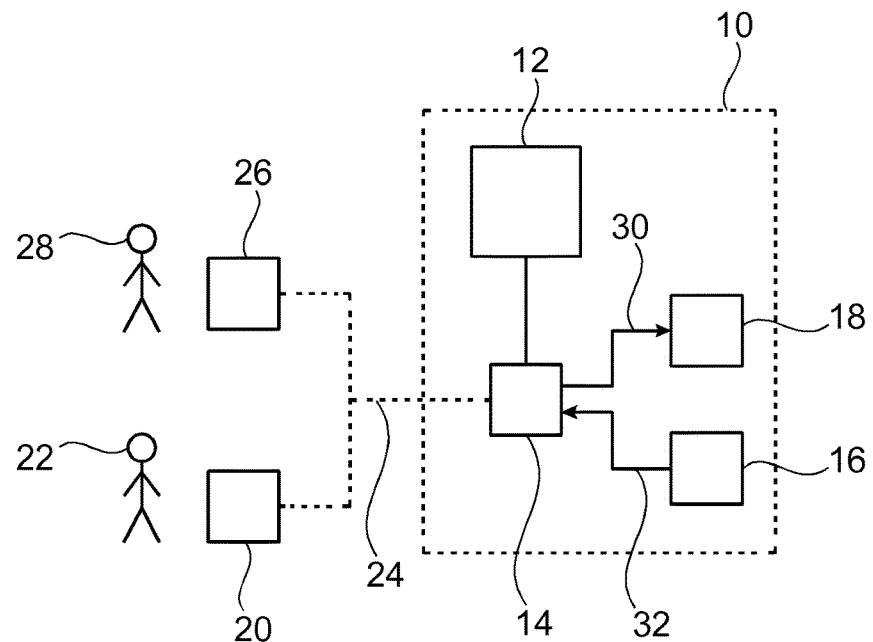
FIG. 1 schematically shows an industrial control system according to an embodiment of the invention.

FIG. 1 shows an industrial control system 10 with a central controller 12 and a programmable logic controller 14 communicatively connected to the central controller 12. Furthermore, the programmable logic controller 14 is communicatively connected to a sensor 16 and an actuator 18. For example, the sensor 16 is a pressure sensor and the actuator 18 is a valve.

It has to be understood that an industrial control system 10 may comprise a plurality of controllers 14, sensors 16 and actuators 18. Due to reasons of simplicity in FIG. 1, only one of them is shown.

The application logic of the programmable logic controller 14 may be updated from a remote PC 20, for example from a PC of an engineer 22 of the control system 10. The remote PC 20 is connected via a data communication network 24 with the controller 14.

Furthermore, a second remote PC 26 of a superuser 28 may be connected to the communication network 24. As will be explained in the following, the superuser 28 may have access rights to not only update the application logic of the programmable logic controller 14 that is responsible for processing the sensor data 32 and for generating output data 30 for controlling the actuator, but to modify security characteristics of the controller 14.

Figure 2:
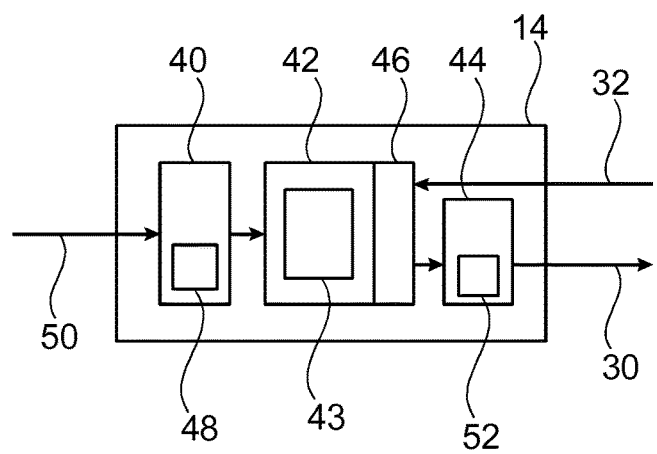
FIG. 2 schematically shows a programmable logic controller according to an embodiment of the invention.

FIG. 2 shows a functional diagram of the programmable logic controller 14. The programmable logic controller 14 comprises an update checking layer 40, an application logic layer 42 and an output checking layer 44. The layers 40, 42, 44 may be computer programs stored in the controller 14. However, the layers 40, 44 may be implemented at least partially in hardware.

The application logic layer 42 comprises or stores application logic 43 of the programmable logic controller 14 that, when executed receives sensor data 32, processes the sensor data 44 and generates output parameters 30 that are output to the actuator 18. The application layer 44 may comprise an input/output layer 46 that is responsible for receiving the input data 32 and for outputting the output parameters 30.

The update checking layer 40 comprises a list of allowable logic updates 48 that is used by the update checking layer 40 for determining, whether an update of the application logic is allowed. Every time the update checking layer 40 receives update data 50 from the data network 24, the update checking layer 40 verifies, whether the application logic updates defined by the update data 48 are listed in the list 46. Only in the case that the application logic updates are in the list 46, the application logic is updated with the update data 50.

The output checking layer 44 comprises a list 52 of allowable output parameters that is used by the output checking layer 44, whether the output parameters 32 generated by the application logic in the application layer 42 are allowed parameters.

Figure 3:
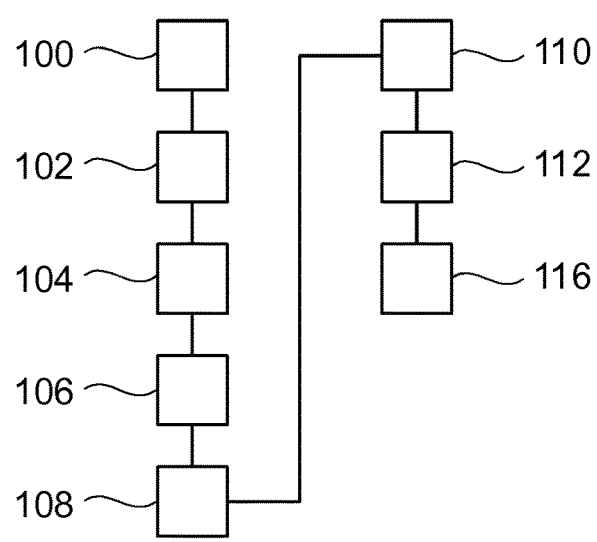
FIG. 3 shows a flow diagram for a method for operation a programmable logic controller according to an embodiment of the invention.

FIG. 3 shows a flow diagram for updating and operating the programmable logic controller 14.

In step 100, the list 48 of allowed logic updates and/or the list 52 of allowed output parameters are stored in the programmable logic controller 14. For example, the list 52 may be part of the list 48 or vice versa.

There are several possibilities, how the lists 48, 52 are stored in the controller 14. They may be stored such that they are not modifiable after an installation of the programmable logic controller 14 in a control system 10. In other words, the list 48, 52 and also the logic of the layers 40, 44 may be burned into the controller 14.

Furthermore, an access to the layers 40, 44 may be restricted to local accesses to the controller 14. For example, the list 48 of allowed logic updates and/or the list 52 of allowed output parameters is only changeable via local access to the programmable logic controller 14.

As another possibility, the layers 40, 44 may be remotely updated, for example from the PC 26 via the data network 24. However, in this case, an update of the list 48 of allowed logic updates and/or the list 52 of allowed output parameters may be allowed only if the update is received from a user 28 with a superuser permission different from a user permission, with which the application logic 43 may be updated.

In step 102, a user 22 tries to remotely update the application logic 43 from the PC 20 via the data network 24 and the update checking layer 40 receives corresponding application logic update data 50 from the PC 20.

In step 104, the update checking layer 40 verifies, whether the user 22 is allowed to update the application logic 43. An update of the application logic 43 may only be allowed if the user 22 has specific user permission.

In step 106, the update checking layer 40 checks, whether the application logic update data 50 is allowed application logic update data. To this end, the update checking layer 40 verifies that every application logic update defined by the application logic update data 50 corresponds to an application logic update in the list 48 of allowed logic updates.

In step 108, only if the application logic update data 50 is allowed application logic update data, the update checking layer 40 updates the application logic 43 with the application logic update data 50.

In step 110, the application logic 43 receives sensor input data 32 from the sensor 16, processes the sensor input data 32 and generates the output parameter 30.

In step 112, the output parameter 30 is received in the output checking layer 44 and the output checking layer 44 checks, whether the output parameter 30 is an allowed output parameter. To this end, the output checking layer 44 verifies whether the output parameter 30 corresponds to the list 52 of allowed output parameters.

In step 114, only if the output parameter is an allowed output parameter 30, the output parameter 30 is output to the actuator 18.

In step 116, when the output checking layer 44 has detected a not allowed output parameter 30, the output checking layer 44 notifies other parts of the control system 10 that a not allowed output parameter has been detected. For example, the central controller 12 may be informed that a controller 14 has been modified in such a way that it generates not allowed parameters.

Additionally, in step 116, the output checking layer 44 may stop the programmable logic controller 14 and/or the actuator 18, in case that a not allowed output parameter has been detected.

Figure 4:
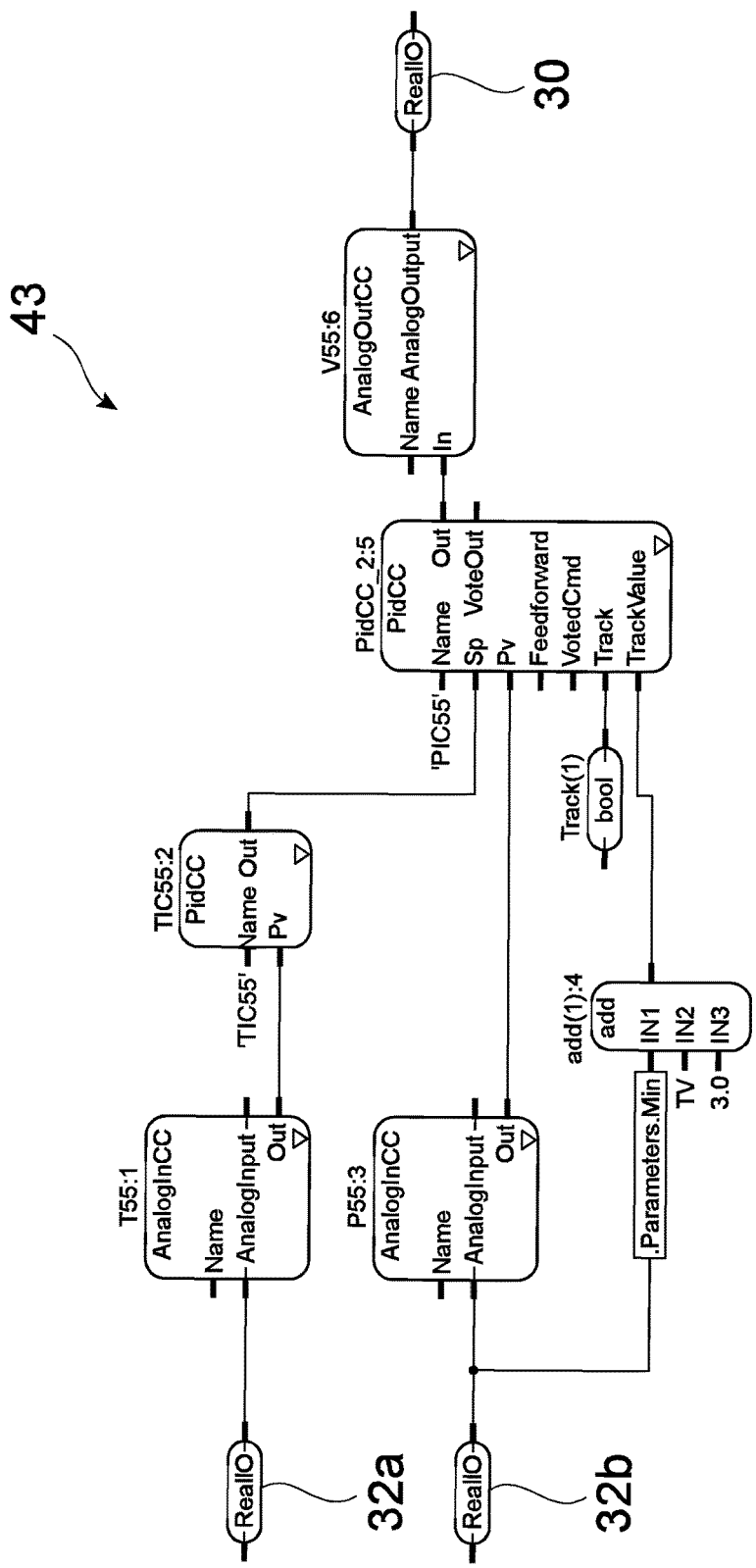
FIG. 4 shows a diagram with application logic for a programmable logic controller according to an embodiment of the invention.

FIG. 4 shows an example for an application logic 43 stored in the application layer 42. In particular, FIG. 4 shows a cascaded control loop for controlling an actuator 18 in the form of a valve 18.

The application logic 43 controls a valve 18 based on temperature sensor data 32*a* and pressure sensor data 32*b* from associated sensors 16. The aim of the application logic 43 is to keep the temperature within a desired range. The valve 18 can only directly influence the pressure, not the temperature. Therefore, a set point for the pressure is computed (in PID TIC55:2) based on the temperature sensor data 32*a*. Based on the current pressure (Pv, "process value") and the desired pressure (Sp, "set point"), the second PID component (PidCC_2:5) computes an output parameter 30 that denotes the degree [0 . . . 1] of valve closure where 0 means that the valve 18 is completely closed and 1 means that the valve 18 is fully open.

Because of limitations of the hardware controlled, the valve 18 cannot be opened and closed arbitrarily. Fully opening a completely closed valve 18 (and fully closing a completely open valve 18) must not be done faster than one second. In addition, the valve 18 must never be fully closed for more than three seconds because otherwise, the physical process becomes unstable. To ensure that no control application logic 43 can damage the hardware we formulate a set of constraints:

$$\text{assert}(\text{Valve}(1)==0 \rightarrow \text{Valve}(1) < 1 \text{ in } [0 \ldots 1000] \text{ ms})$$

$$\text{assert}(\text{Valve}(1)==1 \rightarrow \text{Valve}(1) > 0 \text{ in } [0 \ldots 1000] \text{ ms})$$

$$\text{assert}(\text{Valve}(1)==0 \rightarrow \text{Valve}(1) > 0 \text{ in } [0 \ldots 3000] \text{ ms})$$

An attacker whose goal is to destroy the underlying physical process might change the application logic 43 such that the second PID component (PidCC_2:5) closes the valve 18 for 10 seconds once it observes a certain temperature value. The assertion would ensure that this is not possible and thus reject the change in the application logic 43 (in PidCC_2:5).

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for updating and operating a programmable logic controller, the method comprising:
   generating a list of allowed actuator output parameters by recording all sensor input data and actuator output parameters of an initial application logic and correlating the recorded sensor input data and actuator output parameters to generate the list of allowed actuator output parameters;
   receiving application logic update data in an update checking layer of the programmable logic controller, wherein the application logic update data contains information for updating the initial application logic of the programmable logic controller;

checking the application logic update data by the update checking layer, to assess whether the application logic update data is allowed application logic update data by verifying that every application logic update defined by the application logic update data corresponds to an application logic update from a list of allowed application logic updates; and updating the initial application logic with the application logic update data only if the application logic update data is allowed application logic update data;

receiving sensor input data from at least one sensor coupled to the programmable logic controller;

processing the sensor input data with the updated initial application logic stored in the programmable logic controller to generate an actuator output parameter;

receiving the actuator output parameter in an output checking layer of the programmable logic controller;

checking, during runtime, the actuator output parameter by the output checking layer, to assess whether the actuator output parameter is an allowed actuator output parameter by verifying whether the actuator output parameter corresponds to the list of allowed actuator output parameters; and outputting only an allowed actuator output parameter to an actuator coupled to the programmable logic controller.

2. The method of claim 1, wherein the application logic update data includes an update of a function of the application logic; and wherein an update of a function is allowed when a function is listed in a list of allowed functions that is part of the list of allowed logic updates.

3. The method of claim 2, wherein the application logic update data includes an update of a parameter used by the application logic; and wherein an update of a parameter is allowed when an updated parameter value is within a predefined range defined in a list of predefined ranges of application logic parameter values that is part of the list of allowed logic updates.

4. The method of claim 3, wherein the checking the application logic update data by the update checking layer is independent of an originator of the application logic update data.

5. The method of claim 1, wherein the application logic update data includes an update of a parameter used by the application logic; and wherein an update of a parameter is allowed when an updated parameter value is within a predefined range defined in a list of predefined ranges of application logic parameter values that is part of the list of allowed logic updates.

6. The method of claim 1, wherein the checking the application logic update data by the update checking layer is independent of an originator of the application logic update data.

7. The method of claim 1, comprising: notifying a control system by the output checking layer when a not allowed actuator output parameter has been detected.

8. The method of claim 7, comprising: stopping the programmable logic controller and/or the actuator when a not allowed actuator output parameter has been detected.

9. The method of claim 8, wherein the list of allowed application logic updates and/or the list of allowed actuator output parameters is stored in the programmable logic controller.

10. The method of claim 9, wherein the list of allowed logic updates and/or the list of allowed actuator output parameters is provided in the programmable logic controller such that it is not modifiable after an installation of the programmable logic controller in a control system.

11. The method of claim 1, comprising: stopping the programmable logic controller and/or the actuator when a not allowed actuator output parameter has been detected.

12. The method of claim 1, wherein the list of allowed application logic updates and/or the list of allowed actuator output parameters is stored in the programmable logic controller.

13. The method of claim 1, wherein the list of allowed logic updates and/or the list of allowed actuator output parameters is provided in the programmable logic controller such that it is not modifiable after an installation of the programmable logic controller in a control system.

14. The method of claim 1, wherein the list of allowed logic updates and/or the list of allowed actuator output parameters is only changeable via local access to the programmable logic controller.

15. The method of claim 1, comprising: allowing an update of the application logic only by a user with a specific user permission; and allowing an update of the list of allowed logic updates and/or the list of allowed actuator output parameters only if the update is received from a user with a superuser permission different from the specific user permission.

16. A non-transitory computer-readable medium, on which a computer program according to claim 15 is stored.

17. A programmable logic controller, which contains a computer program stored in non-transitory memory that, when being executed by a processor of the programmable logic controller, will configure the programmable logic controller to execute the method of claim 1.

18. A non-transitory computer-readable medium, on which a computer program according to claim 1 is stored.

19. A programmable logic controller for an industrial control system, the programmable logic controller comprising:

an application logic layer configured for receiving sensor input data from at least one sensor coupled to the programmable logic controller and for processing the sensor input data to generate an actuator output parameter for an actuator; and an update checking layer configured for receiving application logic update data, wherein the application logic update data contains information for updating the application logic, the update checking layer having been configured for checking the application logic update data, to assess whether the application logic update data is allowed application logic update data, by verifying whether every application logic update defined by the application logic update data corresponds to an application logic update from a list of allowed application logic updates, and for updating the application logic only if the update data is allowed application logic update data; and an output checking layer adapted for receiving the actuator output parameter, checking the actuator output parameter, to assess whether the actuator output parameter is an allowed actuator output parameter corresponding to a list of allowed actuator output parameters, and adapted for outputting only an allowed actuator output parameter to an actuator coupled to the programmable logic controller, wherein the actuator output parameter is generated by the updated application logic.

* * * * *